United States Patent
Oguro et al.

(10) Patent No.: US 11,402,844 B2
(45) Date of Patent: Aug. 2, 2022

(54) VEHICLE CONTROL APPARATUS, VEHICLE CONTROL METHOD, AND STORAGE MEDIUM

(71) Applicant: HONDA MOTOR CO., LTD., Tokyo (JP)

(72) Inventors: Chihiro Oguro, Wako (JP); Katsuya Yashiro, Wako (JP); Ayumu Horiba, Wako (JP); Tadahiko Kanoh, Wako (JP); Yuta Takada, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 56 days.

(21) Appl. No.: 16/934,063

(22) Filed: Jul. 21, 2020

(65) Prior Publication Data

US 2021/0034063 A1 Feb. 4, 2021

(30) Foreign Application Priority Data

Jul. 29, 2019 (JP) .............................. JP2019-138950

(51) Int. Cl.
  *G05D 1/02* (2020.01)
  *B60W 30/095* (2012.01)
  (Continued)

(52) U.S. Cl.
  CPC ........... *G05D 1/0221* (2013.01); *B60W 30/09* (2013.01); *B60W 30/0956* (2013.01);
  (Continued)

(58) Field of Classification Search
  CPC .. G05D 1/0221; G05D 1/0214; G05D 1/0223; G05D 1/0246; G05D 1/0257;
  (Continued)

(56) References Cited

U.S. PATENT DOCUMENTS 8,310,353 B2 * 11/2012 Hinninger .............. B60Q 9/008
                                                             340/438
10,011,281 B1 * 7/2018 Kang .................. B60W 50/082
(Continued)

FOREIGN PATENT DOCUMENTS

CN  110271533 A * 9/2019 ............ B60W 30/10
DE  102016114168 A1 * 2/2018 ............ B60R 11/04
(Continued)

OTHER PUBLICATIONS

Japanese Office Action for Japanese Patent Application No. 2019-138950 dated May 31, 2022.

*Primary Examiner* — Angelina Shudy
(74) *Attorney, Agent, or Firm* — Amin, Turocy & Watson, LLP

(57) ABSTRACT

A vehicle control apparatus of an embodiment includes a recognizer which recognizes a surrounding environment of a host vehicle, and a driving controller which controls one or both of a speed and steering of the host vehicle on the basis of a recognition result of the recognizer to perform driving control, wherein the driving controller performs the driving control in at least any of a first driving state and a second driving state having a higher rate of automation or fewer tasks requested for an occupant of the host vehicle than the first driving state, and an operation environment in which route change of the host vehicle in the second driving state is executed is limited as compared to a case of the first driving state.

12 Claims, 11 Drawing Sheets

(51) Int. Cl.
  *B60W 30/09* (2012.01)
  *B60W 30/18* (2012.01)

(52) U.S. Cl.
  CPC ..... *B60W 30/18163* (2013.01); *G05D 1/0214* (2013.01); *G05D 1/0223* (2013.01); *G05D 1/0246* (2013.01); *G05D 1/0257* (2013.01); *B60W 2554/4044* (2020.02); *B60W 2554/4045* (2020.02)

(58) Field of Classification Search
  CPC .... G05D 1/0061; G05D 1/0088; G05D 1/021; B60W 30/09; B60W 30/0956; B60W 30/18163; B60W 2554/4044; B60W 2554/4045; B60W 30/0953; B60W 30/182; B60W 30/18009; B60W 60/0011; B60W 60/0015; B60W 60/0017; B60W 2554/80; B60W 2554/802; G08G 1/16; G08G 1/166; G08G 1/167
  See application file for complete search history.

(56) References Cited

U.S. PATENT DOCUMENTS

| | | | | |
|---|---|---|---|---|
| 10,488,861 | B2 * | 11/2019 | Allan | G05D 1/0246 |
| 10,663,973 | B2 * | 5/2020 | Hashimoto | B60W 30/143 |
| 11,046,333 | B2 * | 6/2021 | Akamatsu | B60W 60/0025 |
| 11,164,455 | B2 * | 11/2021 | Oba | G08G 1/096725 |
| 11,188,082 | B2 * | 11/2021 | Silva | G05D 1/0221 |
| 2005/0216181 | A1 * | 9/2005 | Estkowski | G05D 1/0212 |
| | | | | 701/411 |
| 2008/0291000 | A1 * | 11/2008 | Kim | G01S 7/4813 |
| | | | | 340/436 |
| 2011/0095907 | A1 * | 4/2011 | Kushi | B60W 30/0956 |
| | | | | 340/905 |
| 2011/0095909 | A1 * | 4/2011 | Kushi | G08G 1/161 |
| | | | | 340/905 |
| 2014/0297172 | A1 * | 10/2014 | Huelsen | G08G 1/167 |
| | | | | 701/301 |
| 2015/0251656 | A1 * | 9/2015 | Yester | B60W 30/09 |
| | | | | 701/41 |
| 2015/0360684 | A1 * | 12/2015 | Matsuno | B60Q 9/00 |
| | | | | 701/23 |
| 2016/0259334 | A1 * | 9/2016 | Hashimoto | B60W 40/04 |
| 2016/0355178 | A1 * | 12/2016 | Shiraishi | B60W 30/06 |
| 2017/0102700 | A1 * | 4/2017 | Kozak | G05D 1/0061 |
| 2017/0236415 | A1 * | 8/2017 | Okabe | G08G 1/0129 |
| | | | | 701/117 |
| 2017/0315551 | A1 * | 11/2017 | Mimura | B62D 15/025 |
| 2017/0327094 | A1 * | 11/2017 | Inoue | B60W 30/09 |
| 2018/0043897 | A1 * | 2/2018 | Hashimoto | B60W 60/001 |
| 2018/0046196 | A1 * | 2/2018 | Hashimoto | B60W 30/143 |
| 2018/0072326 | A1 * | 3/2018 | Ichikawa | B60W 30/182 |
| 2018/0074497 | A1 * | 3/2018 | Tsuji | G01C 21/3617 |
| 2018/0120859 | A1 * | 5/2018 | Eagelberg | B60W 60/00274 |
| 2018/0143648 | A1 * | 5/2018 | Kim | B60W 30/09 |
| 2018/0178802 | A1 * | 6/2018 | Miyata | B60W 30/18163 |
| 2018/0229741 | A1 * | 8/2018 | Narita | B60W 50/14 |
| 2018/0233049 | A1 * | 8/2018 | Ishii | G08G 1/167 |
| 2019/0016339 | A1 * | 1/2019 | Ishioka | G08G 1/16 |
| 2019/0084558 | A1 * | 3/2019 | Kaminade | B60W 30/09 |
| 2019/0184994 | A1 * | 6/2019 | Mizuno | G06K 9/00825 |
| 2019/0189006 | A1 * | 6/2019 | Toma | B60W 50/0097 |
| 2019/0202476 | A1 * | 7/2019 | Tao | B60W 30/095 |
| 2019/0206254 | A1 * | 7/2019 | Tao | B60W 50/14 |
| 2019/0329781 | A1 * | 10/2019 | Natsumi | B60W 50/14 |
| 2019/0339702 | A1 * | 11/2019 | Isele | G06N 7/005 |
| 2020/0031352 | A1 * | 1/2020 | Takaki | B60W 30/09 |
| 2020/0079364 | A1 * | 3/2020 | Min | B60W 30/18163 |
| 2020/0097008 | A1 * | 3/2020 | Sadat | G05D 1/0212 |
| 2020/0111369 | A1 * | 4/2020 | Cho | G08G 1/167 |
| 2020/0180618 | A1 * | 6/2020 | Ohmura | G08G 1/16 |
| 2020/0180638 | A1 * | 6/2020 | Kanoh | B60W 30/095 |
| 2020/0225669 | A1 * | 7/2020 | Silva | G05D 1/0257 |
| 2020/0371527 | A1 * | 11/2020 | Kim | G06K 9/00805 |
| 2021/0403015 | A1 * | 12/2021 | Kato | B60Q 1/00 |

FOREIGN PATENT DOCUMENTS

| | | | | |
|---|---|---|---|---|
| DE | 112019000065 | T5 * | 3/2020 | B60W 30/09 |
| DE | 102019008864 | A1 * | 7/2020 | |
| JP | 2010211304 | A * | 9/2010 | |
| JP | 2014076689 | A * | 5/2014 | |
| JP | 2014180986 | A * | 9/2014 | B60W 50/14 |
| JP | 2015230679 | A * | 12/2015 | |
| JP | 2016038379 | A * | 3/2016 | G01C 21/165 |
| JP | 2017-207907 | | 11/2017 | |
| JP | 2019-006280 | | 1/2019 | |
| WO | 2017/179193 | | 10/2017 | |

\* cited by examiner

VEHICLE CONTROL APPARATUS, VEHICLE CONTROL METHOD, AND STORAGE MEDIUM

CROSS-REFERENCE TO RELATED APPLICATION

Priority is claimed on Japanese Patent Application No. 2019-138950, filed Jul. 29, 2019, the content of which is incorporated herein by reference.

BACKGROUND

Field of the Invention

The present invention relates to a vehicle control apparatus, a vehicle control method, and a storage medium.

Description of Related Art

Recently, research on controlling vehicles in an automated manner has been conducted. In this regard, a technology of executing automated driving in a first automated driving mode when a distance to and a speed of a target vehicle traveling in front of a host vehicle in a host lane satisfy predetermined conditions and changing lanes behind other vehicles traveling in other lanes at speeds equal to or less than a predetermined speed when the predetermined conditions are not satisfied is known (for example, Japanese Unexamined Patent Application, First Publication No. 2019-6280).

SUMMARY

However, in the conventional technology, there are cases in which details of a task request for an occupant and a rate of automation in an automated driving state change during route change.

An object of one aspect of the present invention devised in view of such circumstances is to provide a vehicle control apparatus, a vehicle control method, and a storage medium which can execute more stable driving control on the basis of a surrounding environment of a host vehicle.

A vehicle control apparatus, a vehicle control method, and a storage medium according to the present invention employ the following configurations.

(1): A vehicle control apparatus according to one aspect of the present invention is a vehicle control apparatus including: a recognizer which recognizes a surrounding environment of a host vehicle; and a driving controller which controls one or both of a speed and steering of the host vehicle on the basis of a recognition result of the recognizer to perform driving control, wherein the driving controller performs the driving control in at least any of a first driving state and a second driving state having a higher rate of automation or fewer tasks requested for an occupant of the host vehicle than the first driving state, wherein an operation environment in which route change of the host vehicle in the second driving state is executed is limited as compared to a case of the first driving state.

(2): In the aforementioned aspect of (1), the driving controller causes transition of the driving control from the second driving state to the first driving state when a request for the route change is received in an operation environment in which the route change is not executable in the second driving state.

(3): In the aforementioned aspect of (1), the recognizer recognizes a first inter-vehicle distance between a preceding vehicle traveling in front of the host vehicle and a following vehicle traveling behind the host vehicle in a first lane in which the host vehicle is traveling, and the driving controller causes the first inter-vehicle distance in which the route change is executed in the second driving state to be shorter than an inter-vehicle distance in which the route change is executed in the first driving state.

(4): In the aforementioned aspect of (1), the recognizer recognizes a first shielded area due to a preceding vehicle traveling in front of the host vehicle and a second shielded area due to a following vehicle traveling behind the host vehicle in a first lane in which the host vehicle is traveling, and the driving controller executes the route change in the second driving state when the first shielded area and the second shielded area are less than a predetermined area.

(5): In the aforementioned aspect of (1), the recognizer recognizes another vehicle at a route change destination of the host vehicle, and the driving controller performs route change of the host vehicle to a second lane that is the route change destination in the second driving state when a speed of the other vehicle recognized by the recognizer is less than a speed set on the basis of at least one of the speed of the host vehicle, a set speed set for the host vehicle, and a legal speed limit of the second lane.

(6): In the aforementioned aspect of (5), the driving controller performs route change in the second driving state when route change of another vehicle traveling in the second lane is not predicted.

(7): In the aforementioned aspect of (1), the driving controller limits an upper limit number of times of route change in the second driving state in a predetermined time or a predetermined travel distance to being less than an upper limit number of times of route change in the first driving state.

(8): In the aforementioned aspect of (1), the driving controller curbs route change in the second driving state when the position of the host vehicle is within a predetermined distance from a predetermined area.

(9): In the aforementioned aspect of (1), the recognizer recognizes a behavior of another vehicle or predicts a future behavior of the other vehicle, and the driving controller executes route change in the second driving state on the basis of the behavior of the other vehicle recognized by the recognizer or the future behavior of the other vehicle predicted by the recognizer.

(10): In the aforementioned aspect of (9), the driving controller curbs route change in the second driving state when it is predicted that the other vehicle will perform route change to a target position of a route change destination of the host vehicle on the basis of a recognition result of the recognizer.

(11): In the aforementioned aspect of (1), the recognizer recognizes vehicle information on another vehicle traveling in front of the host vehicle in a first lane in which the host vehicle is traveling and another vehicle which will be followed by the host vehicle after route change of the host vehicle in a second lane that is the route change destination, and the driving controller executes driving control of causing the host vehicle to follow another vehicle having a higher degree of similarity with vehicle information of the host vehicle.

(12): A vehicle control method according to one aspect of the present invention is a vehicle control method, using an on-board computer, including: recognizing a surrounding environment of a host vehicle; controlling one or both of a speed and steering of the host vehicle on the basis of a recognition result to perform driving control; and performing the driving control in at least any of a first driving state and a second driving state having a higher rate of automation or fewer tasks requested for an occupant of the host vehicle than the first driving state, wherein an operation environment in which route change of the host vehicle in the second driving state is executed is limited as compared to a case of the first driving state.

(13): A storage medium according to one aspect of the present invention is a computer-readable non-transitory storage medium storing a program causing an on-board computer to: recognize a surrounding environment of a host vehicle; control one or both of a speed and steering of the host vehicle on the basis of a recognition result to perform driving control; and perform the driving control in at least any of a first driving state and a second driving state having a higher rate of automation or fewer tasks requested for an occupant of the host vehicle than the first driving state, wherein an operation environment in which route change of the host vehicle in the second driving state is executed is limited as compared to a case of the first driving state.

According to the aforementioned aspects (1) to (13), it is possible to execute more stable driving control on the basis of a surrounding environment of a host vehicle.

DESCRIPTION OF EMBODIMENTS

Hereinafter, embodiments of a vehicle control apparatus, a vehicle control method, and a storage medium of the present invention will be described with reference to the drawings. The vehicle control apparatus of embodiments is applied to, for example, vehicles for automated driving. Automated driving is controlling one or both of steering and acceleration/deceleration of a vehicle to perform driving control, for example. The aforementioned driving control includes, for example, driving control such as an adaptive cruise control (ACC) system, traffic jam pilot (TJP), auto lane changing (ALC), a collision mitigation brake system (CMBS), and a lane keeping assistance system (LKAS). With respect to vehicles for automated driving, driving control according to manual driving of an occupant (driver) may be executed. Although cases in which the law of the left-hand traffic is applied will be described hereinafter, left and right may be reversed when the law of the right-handed traffic is applied. Hereinafter, description will be given on the assumption that one direction in a horizontal direction is X, another direction is Y, and a vertical direction perpendicular to the horizontal directions X-Y is Z.

[Overall Configuration]

Figure 1:
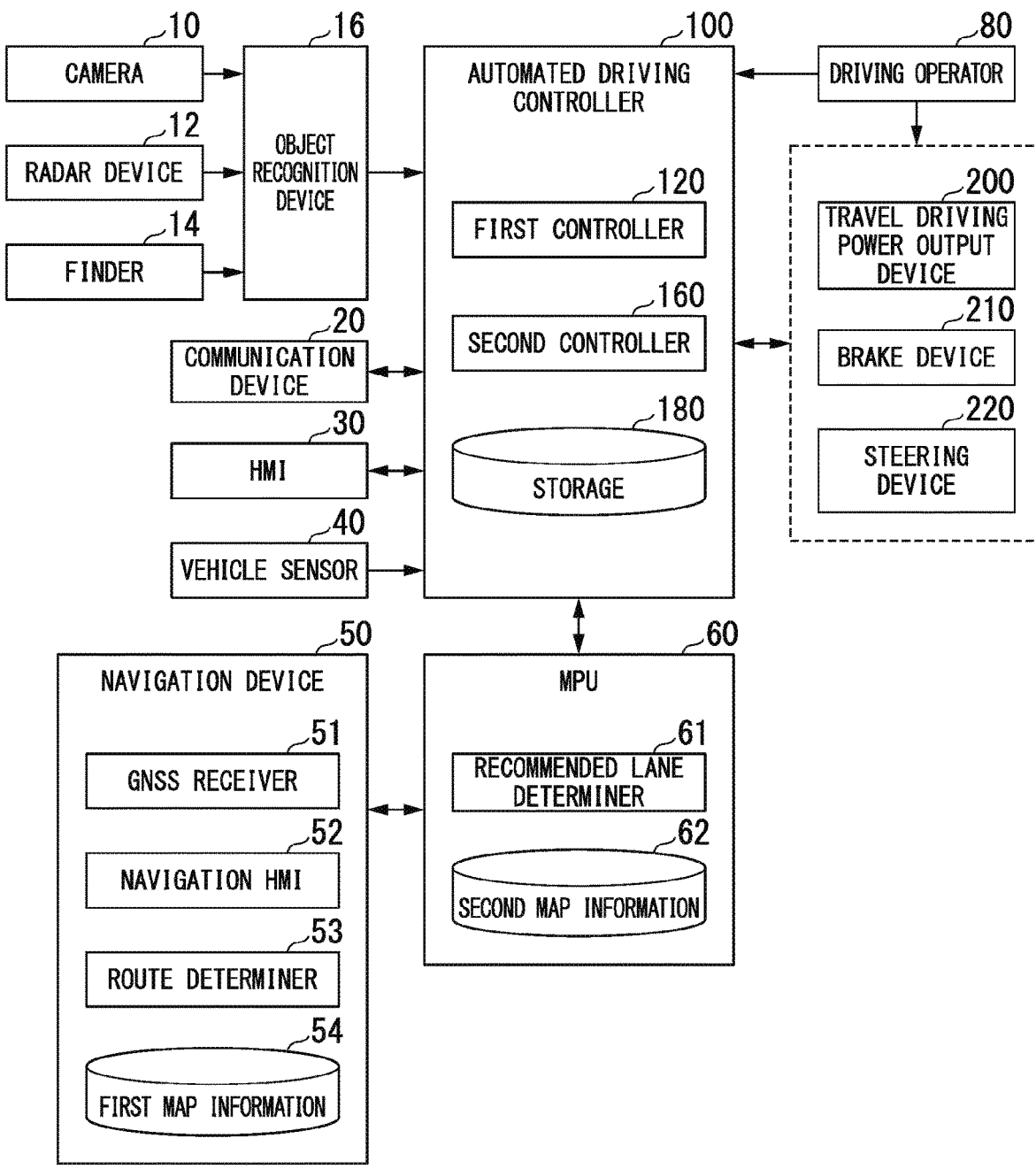
FIG. 1 is a configuration diagram of a vehicle system using a vehicle control apparatus according to an embodiment.

FIG. 1 is a configuration diagram of a vehicle system 1 using a vehicle control apparatus according to an embodiment. A vehicle (hereinafter referred to as a host vehicle M) in which the vehicle system 1 is mounted may be, for example, a two-wheeled, three-wheeled, four-wheeled vehicle or the like and a driving source thereof includes an internal combustion engine such as a diesel engine or a gasoline engine, a motor, or a combination thereof. The motor operates using power generated by a generator connected to the internal combustion engine or power discharged from a secondary battery or a fuel battery.

For example, the vehicle system 1 may include a camera (an example of an imager) 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving controller 100, a travel driving power output device 200, a brake device 210, and a steering device 220. These devices and apparatuses are connected through a multiplex communication line such as a controller area network (CAN) communication line, a serial communication line, a wireless communication network, and the like. The configuration shown in FIG. 1 is merely an example and some of the components may be omitted or other components may be further added. The automated driving controller 100 is an example of a "driving control device."

For example, the camera 10 may be a digital camera using a solid state imaging device such as a charge coupled device (CCD) or a complementary metal oxide semiconductor (CMOS). The camera 10 is attached to any position on the host vehicle M. When a forward view image of the host vehicle M is captured, for example, the camera 10 is attached to the upper part of the front windshield, the rear side of a rear view mirror, or the like. When a rear view image of the host vehicle M is captured, the camera 10 is attached to the upper part of the rear windshield, or the like. When a right-side view or a left-side view of the host vehicle M is captured, the camera 10 is attached to the right side or the left side of the vehicle body or the door mirror, or the like. For example, the camera 10 may periodically repeatedly capture images of the surroundings of the host vehicle M. The camera 10 may be a stereo camera.

The radar device 12 radiates electric waves such as millimeter waves to the surroundings of the host vehicle M and detects electric waves reflected by an object (reflected waves) to detect at least the position of (distance to and direction of) the object. The radar device 12 is attached to any position on the host vehicle M. The radar device 12 may detect the position and speed of an object according to a frequency modulated continuous wave (FM-CW) method.

The finder 14 is a light detection and ranging (LIDAR) device. The finder 14 radiates light to the surroundings of the host vehicle M and measures scattering light. The finder 14 detects a distance to a target on the basis of a time from light emission to light reception. Radiated light may be pulse-shaped laser light, for example. The finder 14 is attached to any position on the host vehicle M.

The object recognition device 16 performs a sensor fusion process on detection results of some or all of the camera 10, the radar device 12 and the finder 14 to recognize the position, type, speed and the like of an object. The object recognition device 16 outputs a recognition result to the automated driving controller 100. The object recognition device 16 may output detection results of the camera 10, the radar device 12 and the finder 14 to the automated driving controller 100 as they are. In this case, the object recognition device 16 may be omitted from the vehicle system 1.

The communication device 20 communicates with other vehicles around the host vehicle M using a cellular network, a Wi-Fi network, Bluetooth (registered trademark), dedicated short range communication (DSRC), and the like, for example, or communicates with various server devices through a wireless base station.

The HMI 30 presents various types of information to an occupant (including a driver) of the host vehicle M and receives an input operation from the occupant. The HMI 30 includes, for example, various display devices, speakers, buzzers, touch panels, switches, keys, etc. For example, the HMI 30 may include a direction indicator through which a traveling direction of the host vehicle M according to an intention (operation) of an occupant is received.

The vehicle sensor 40 includes a vehicle speed sensor that detects the speed of the host vehicle M, an acceleration sensor that detects an acceleration, a yaw rate sensor that detects an angular velocity around a vertical axis, a heading sensor that detects the direction of the host vehicle M, etc.

The navigation device 50 may include a global navigation satellite system (GNSS) receiver 51, a navigation HMI 52 and a route determiner 53, for example. The navigation device 50 stores first map information 54 in a storage device such as a hard disk drive (HDD) or a flash memory. The GNSS receiver 51 identifies the position of the host vehicle M on the basis of signals received from a GNSS satellite. The position of the host vehicle M may be identified or complemented for by an inertial navigation system (INS) using the output of the vehicle sensor 40. The navigation HMI 52 includes a display device, a speaker, a touch panel, keys, etc. A part or all of the navigation HMI 52 and the aforementioned HMI 30 may be made to be common. The route determiner 53 determines a route (hereinafter, a route on a map) to a destination input by an occupant using the navigation HMI 52 from the position of the host vehicle M identified by the GNSS receiver 51 (or any input position) with reference to the first map information 54, for example. The first map information 54 may be information in which road shapes are represented according to links indicating roads and nodes connected by links, for example. The first map information 54 may include curvatures of roads and point-of-interest (POI) information, and the like. A route on a map is output to the MPU 60. The navigation device 50 may perform route guide using the navigation HMI 52 on the basis of roads on a map. For example, the navigation device 50 may be realized by functions of a terminal device such as a smartphone or a tablet terminal possessed by an occupant. The navigation device 50 may transmit a current position and a destination to a navigation server through the communication device 20 and acquire the same route as a route on a map from the navigation server.

The MPU 60 includes a recommended lane determiner 61, for example, and stores second map information 62 in a storage device such as an HDD or a flash memory. The recommended lane determiner 61 divides a route on a map provided from the navigation device 50 into a plurality of blocks (divides the route into intervals of 100 m in a vehicle traveling direction, for example) and determines a recommended lane for each block with reference to the second map information 62. The recommended lane determiner 61 performs determination in such a manner that on which lane from the left the vehicle will travel is determined. When a route on a map includes a branch point, the recommended lane determiner 61 determines recommended lanes such that the host vehicle M can travel on a reasonable route for traveling to a branch destination.

The second map information 62 is map information with higher-accuracy than the first map information 54. For example, the second map information 62 may include information on the centers of lanes, information on the boundaries of lanes, or the like. The second map information 62 may include road information, traffic regulations information, address information (addresses and zip codes), facility information, telephone number information, etc. The second map information 62 may be updated at any time through communication between the communication device 20 and other devices.

The driving operator 80 may include an accelerator pedal, a brake pedal, a shift lever, a steering wheel, a modified steering wheel, a joystick, and other operators, for example. A sensor that detects an operation amount or presence or absence of an operation is attached to the driving operator 80 and a detection result thereof is output to the automated driving controller 100 or some or all of the travel driving power output device 200, the brake device 210 and the steering device 220.

The automated driving controller 100 may include a first controller 120, a second controller 160, and a storage 180, for example. Each of the first controller 120 and the second controller 160 may be realized by a hardware processor such as a central processing unit (CPU) executing a program (software), for example. Some or all of these components may be realized by hardware (circuit; including circuitry) such as a large scale integration (LSI) circuit, an application specific integrated circuit (ASIC), a field-programmable gate array (FPGA), and a graphics processing unit (GPU) or realized by software and hardware in cooperation. Programs may be stored in advance in a storage device (storage device including a non-transitory storage medium) of the automated driving controller 100, such as an HDD or a flash memory, or stored in a detachable storage medium such as a DVD or a CD-ROM and installed in the HDD or the flash memory of the automated driving controller 100 by setting the storage medium (non-transitory storage medium) in a drive device.

The storage 180 is realized by the aforementioned various storage devices. The storage 180 may be realized, for example, by an HDD, a flash memory, an electrically erasable programmable read only memory (EEPROM), a read only memory (ROM), a random access memory (RAM), or the like. The storage 180 may store, for example, programs and other various types of information.

Figure 2:
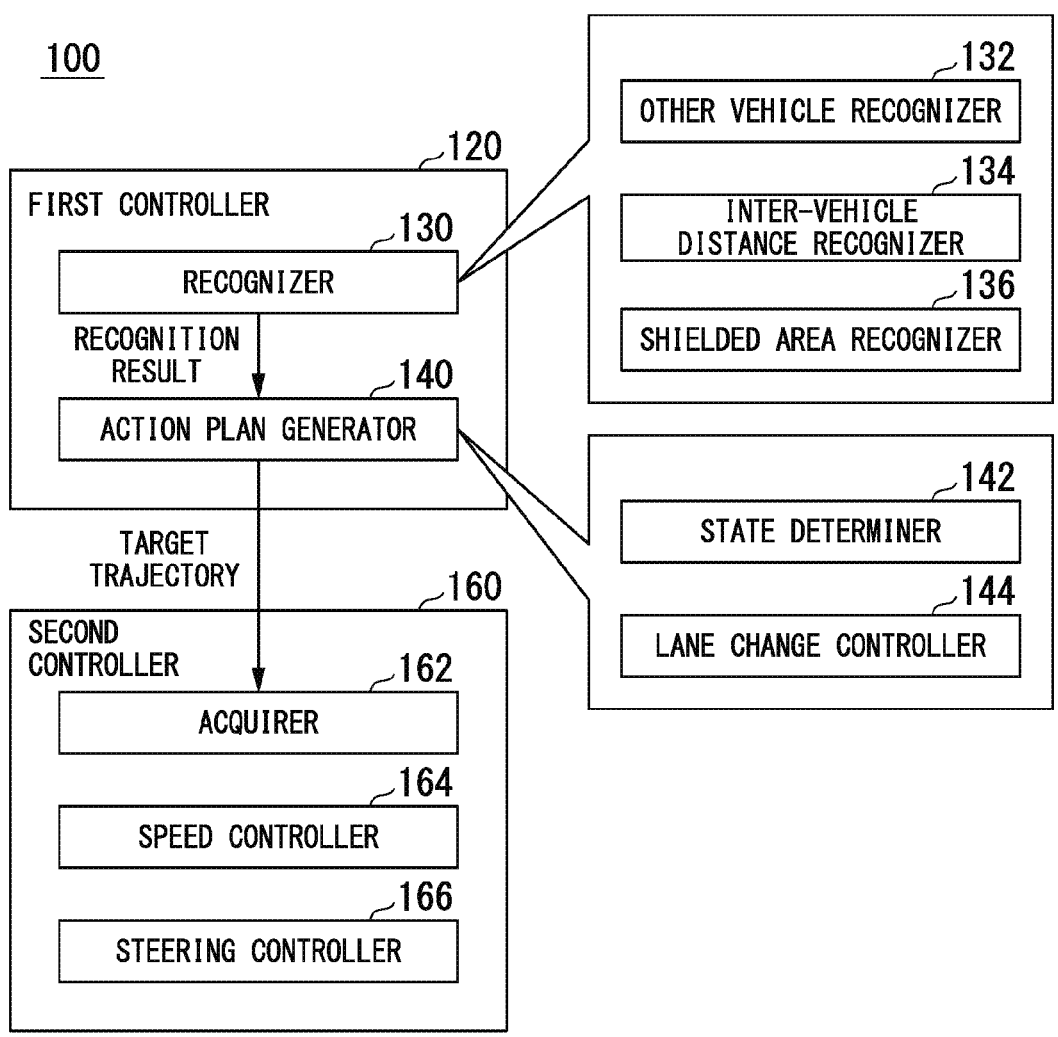
FIG. 2 is a functional configuration diagram of a first controller and a second controller.

FIG. 2 is a functional configuration diagram of the first controller 120 and the second controller 160. The first controller 120 may include a recognizer 130 and an action plan generator 140, for example. A combination of the action plan generator 140 and the second controller 160 is an example of a "driving controller." The first controller 120 may realize a function using artificial intelligence (AI) and a function using a model provided in advance in parallel, for example. For example, a function of "recognizing an intersection" may be realized by performing recognition of an intersection using deep learning or the like and recognition based on conditions provided in advance (which include a signal which can be pattern-matched, road markings and the like) in parallel and assigning scores to results of both the recognitions to integrally evaluate the recognition results. Accordingly, reliability of automated driving is secured.

The recognizer 130 recognizes the surrounding environment of the host vehicle M. For example, the recognizer 130 may recognize states, such as the positions, speeds, accelerations and traveling directions, of objects (e.g., neighboring vehicles and objects) around the host vehicle M on the basis of information input from the camera 10, the radar device 12, and the finder 14 through the object recognition device 16. For example, the position of an object may be recognized as a position on absolute coordinates having a representative point (the center of gravity, the center of the drive shaft or the like) of the host vehicle M as the origin and used for control. The position of an object may be represented as a representative point of the object, such as the center of gravity, the center or a corner of the object, or may be represented as a representative region. When an object is a vehicle, "states" of the object may include the acceleration and jerk of the object or an "action state" (e.g., whether lane change is being performed or is intended to be performed).

The recognizer 130 recognizes, for example, a lane (traveling lane) in which the host vehicle M is traveling. For example, the recognizer 130 may recognize the traveling lane by comparing a lane marking pattern (e.g., arrangement of solid lines and dashed lines) obtained from the second map information 62 with a lane marking pattern around the host vehicle M recognized from an image captured by the camera 10. The recognizer 130 may recognize the traveling lane by recognizing traveling course boundaries (road boundaries) including lane markings, road shoulders, curbs, medians, guardrails and the like as well as lane markings. In this recognition, the position of the host vehicle M acquired from the navigation device 50 and a processing result of the INS may be taken into account. The recognizer 130 recognizes stop lines, obstacles, red signals, tollgates, and other road events.

The recognizer 130 recognizes a position and an attitude of the host vehicle M with respect to the traveling lane when the traveling lane is recognized. For example, the recognizer 130 may recognize a distance between a representative point of the host vehicle M and the center of the lane and an angle between a traveling direction (Y direction) of the host vehicle M and a line connecting the center of the lane as a relative position and attitude of the host vehicle M with respect to the traveling lane. Instead of this, the recognizer 130 may recognize the position of the representative point of the host vehicle M or the like with respect to any side edge of the traveling lane (a lane marking or a road boundary) as a relative position of the host vehicle M with respect to the traveling lane.

The recognizer 130 recognizes information about positions of neighboring vehicles on the basis of vehicles around the host vehicle M recognized from an image captured by the camera 10, images captured by the camera 10, information on congestion around the host vehicle M acquired by the navigation device 50, or positional information acquired from the second map information 62.

The recognizer 130 may acquire various types of information received from vehicles and the like traveling around the host vehicle M through vehicle-to-vehicle communication via the communication device 20 and recognize the surroundings of the host vehicle M on the basis of the information. The recognizer 130 may include, for example, an other vehicle recognizer 132, an inter-vehicle distance recognizer 134, and a shielded area recognizer 136. These functions will be described in detail later.

The action plan generator 140 generates a target trajectory through which the host vehicle M will automatically travel (without depending on an operation of a driver) in the future such that the host vehicle M travels in a recommended lane determined by the recommended lane determiner 61 in principle and can cope with a surrounding situation thereof. For example, a target trajectory may include a speed factor. For example, a target trajectory may be represented as a sequential arrangement of points (trajectory points) at which the host vehicle M will arrive. A trajectory point is a point at which the host vehicle M will arrive for each predetermined traveling distance (e.g., approximately several meters) in a distance along a road, and a target speed and a target acceleration for each predetermined sampling time (e.g., approximately several tens of a second) are generated as a part of a target trajectory apart from trajectory points. A trajectory point may be a position at which the host vehicle M will arrive at a sampling time for each predetermined sampling time. In this case, information on a target speed and a target acceleration is represented by a spacing between trajectory points.

The action plan generator 140 may set an automated driving event upon generation of a target trajectory. Automated driving events include a constant-speed travel event, a low-speed following travel event, a lane change event, a branch event, a merging event, a takeover event, and the like. The action plan generator 140 generates a target trajectory in response to a started event.

The action plan generator 140 has a plurality of driving states including at least a first driving state and a second driving state and executes driving control according to any of the driving states to cause the host vehicle M to operate. The first driving state is a driving state in which a predetermined task is assigned to an occupant (e.g., a driver) of the host vehicle M. The predetermined task may include, for example, a task of keeping eyes on the front of the host vehicle M (hereinafter, a first task) and a task of holding the steering wheel (second task). The second driving state is a driving state in which tasks assigned to the occupant of the host vehicle M are reduced compared to the first driving state (that is, a rate of automation is higher than that of the first driving state).

For example, the first driving state is low-level automated driving and a driving state in which the first task is assigned and the second task is assigned to a driver as necessary. The second driving state is higher-level automated driving than the first driving state and a driving state in which the second task is not assigned to a driver and the first task is assigned to the driver or a driving state in which the first task and the second task are not assigned. The first driving state may include manual driving. In other words, in the relationship between the first driving state and the second driving state, a state in which the amount of tasks reduced to the maximum among a plurality of tasks that can be assigned in advance to a driver is large is the second driving state and a state in which a reduced task amount is less than that of the second driving state is the first driving state. The action plan generator 140 may include three or more driving states. In this case, the first driving state and the second driving states may be subdivided, a driving state in which a new task is assigned may be added, and the first driving state may be discriminated from manual driving.

The action plan generator 140 may maintain the second driving state as it is even when a state in which the driver actually places the hands on (i.e., holds) the steering wheel in a state in which the second task is not assigned (so-called a hands-off state) is recognized (detected). The action plan generator 140 may include, for example, a state determiner 142 and a lane change controller 144. These functions will be described in detail later.

The second controller 160 controls the travel driving power output device 200, the brake device 210 and the steering device 220 such that the host vehicle M passes through a target trajectory generated by the action plan generator 140 on scheduled time.

For example, the second controller 160 may include an acquirer 162, a speed controller 164, and a steering controller 166. The acquirer 162 acquires information on a target trajectory (trajectory points) generated by the action plan generator 140 and stores the information in a memory (not shown). The speed controller 164 controls the travel driving power output device 200 or the brake device 210 on the basis of a speed factor included in the target trajectory stored in the memory. The steering controller 166 controls the steering device 220 in response to a degree of bending of the target trajectory stored in the memory. Processing of the speed controller 164 and the steering controller 166 may be realized by feedforward control and feedback control in combination, for example. As an example, the steering controller 166 executes feedforward control according to a curvature of a road ahead of the host vehicle M and feedback control based on a deviation from a target trajectory in combination.

The travel driving power output device 200 outputs a travel driving power (torque) for traveling of a vehicle to driving wheels. For example, the travel driving power output device 200 may include a combination of an internal combustion engine, a motor, a transmission and the like, and an electronic control unit (ECU) which controls these components. The ECU controls the aforementioned components according to information input from the second controller 160 or information input from the driving operator 80.

The brake device 210 may include a brake caliper, a cylinder which transfers a hydraulic pressure to the brake caliper, an electric motor which generates a hydraulic pressure in the cylinder, and a brake ECU, for example. The brake ECU controls the electric motor according to information input from the second controller 160 or information input from the driving operator 80 such that a brake torque according to a braking operation is output to each vehicle wheel. The brake device 210 may include a mechanism for transferring a hydraulic pressure generated by an operation of the brake pedal included in the driving operator 80 to the cylinder through a master cylinder as a backup. The brake device 210 is not limited to the above-described configuration and may be an electronically controlled hydraulic brake device which controls an actuator according to information input from the second controller 160 and transfers a hydraulic pressure of a master cylinder to a cylinder.

The steering device 220 may include a steering ECU and an electric motor, for example. For example, the electric motor may change the direction of the steering wheel by applying a force to a rack-and-pinion mechanism. The steering ECU drives the electric motor according to information input from the second controller 160 or information input from the driving operator 80 to change the direction of the steering wheel.

[Functions of Recognizer and Action Plan Generator]

Hereinafter, the functions of the recognizer 130 and the action plan generator 140 according to an embodiment will be described in detail. Although an example of route change of the host vehicle M will be described using lane change of the host vehicle M in the following description, it is assumed that route change also includes route change such as change of a vehicle line in which the host vehicle M is traveling, and the like in a situation in which a vehicle line is formed on a road having no lanes, for example.

Figure 3:
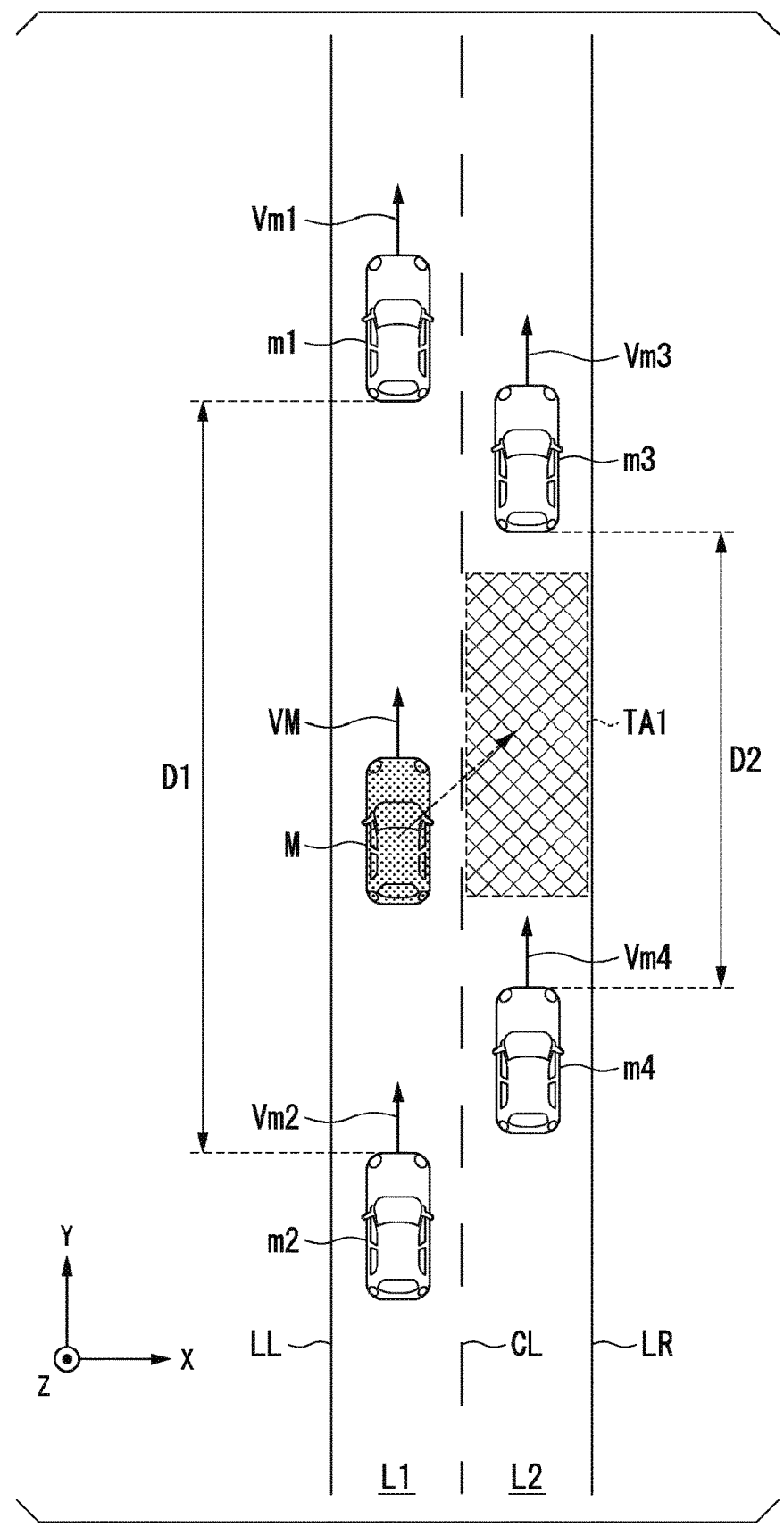
FIG. 3 is a diagram for describing a recognizer and an action plan generator.

FIG. 3 is a diagram for describing the recognizer 130 and the action plan generator 140. In the example of FIG. 3, two lanes L1 and L2 in which vehicles can travel in the same direction (Y direction) are represented. The lane L1 is an example of a "first lane" and is defined by markings LL and CL. The lane L2 is an example of a "second lane" and is defined by markings CL and LR. The markings CL indicate that lane change between the lane L1 and the lane L2 can be performed. In the example of FIG. 3, it is assumed that the host vehicle M, and other vehicles m1 and m2 are traveling in the lane L1 at speeds VM, Vm1 and Vm2, respectively, and other vehicles m3 and m4 are traveling in the lane L2 at speeds Vm3 and Vm4, respectively. Hereinafter, the lane L1 in which the host vehicle M is traveling is referred to as "host lane L1" and the lane L2 is referred to as "neighboring lane L2."

The other vehicle recognizer 132 recognizes other vehicles traveling around the host vehicle M on the basis of a surrounding environment recognized by the recognizer 130. Other vehicles traveling around the host vehicle M may be, for example, other vehicles present within a predetermined distance from the host vehicle M. Vehicles traveling around the host vehicle M may be, for example, vehicles traveling in the host lane L1 in which the host vehicle M is traveling and the neighboring lane L2. The other vehicle recognizer 132 recognizes relative positions and speeds of the recognized other vehicles. In the example of FIG. 3, the other vehicle recognizer 132 recognizes the positions and speeds of the other vehicles m1 to m4. Hereinafter, it is assumed that the other vehicles m1 to m4 may be referred to as a preceding vehicle m1, a following vehicle m2, a front reference vehicle m3, and a rear reference vehicle m4 for clarifying differences between vehicles.

The inter-vehicle distance recognizer 134 recognizes a first inter-vehicle distance D1 between the preceding vehicle m1 and the following vehicle m2 that are vehicles traveling before and after the host vehicle M from among other vehicles traveling in the host lane L1. The first inter-vehicle distance D1 may be a distance from the rear end of the preceding vehicle m1 to the front end of the following vehicle m2, for example. The inter-vehicle distance recognizer 134 recognizes a second inter-vehicle distance D2 between the front reference vehicle m3 and the rear reference vehicle m4 that are traveling before and after a target position TA1 positioned after the host vehicle M performs lane change from among other vehicles traveling in the neighboring lane L2 that is a lane change destination candidate. The second inter-vehicle distance D2 may be a distance from the rear end of the front reference vehicle m3 at the target position TA1 to the front end of the rear reference vehicle m4 at the target position TA1, for example.

The target position TA1 is a position of a lane change destination that is a target when the host vehicle M changes lanes and is set by the lane change controller 144.

The lane change controller 144 selects two other vehicles from a plurality of other vehicles traveling in the neighboring lane L2 to which the host vehicle M will change lanes and sets the lane change target position TA1 between the selected two other vehicles. In the example of FIG. 3, the target position TA1 is set as a relative position with respect to the front reference vehicle m3 and the rear reference vehicle m4 that are traveling in the neighboring lane L2. The lane change controller 144 sets the target position TA1 within a range of at least a predetermined distance away from the front reference vehicle m3 and the rear reference vehicle m4 in consideration of future speed change of the front reference vehicle m3 and the rear reference vehicle m4. The lane change controller 144 focuses on four neighboring vehicles (the other vehicles m1 to m4) on the basis of the target position TA1 and determines a target speed and the like when lane change will be performed. Although the host vehicle M needs to perform acceleration/deceleration in order to move to the side of the target position TA1, the host vehicle M must avoid catching up with the preceding vehicle m1 at this time. Accordingly, the lane change controller 144 predicts future states of the four other vehicles and determines a target speed such that the host vehicle M does not interfere with the other vehicles.

When one or both of the front reference vehicle m3 and the rear reference vehicle m4 that are traveling in the neighboring lane L2 are not present, the lane change controller 144 may set the target position TA1 on the basis of the positions and speeds of vehicles present and the host vehicle M.

The state determiner 142 determines a driving state in the automated driving controller 100 on the basis of a surrounding situation recognized by the recognizer 130. In the following, description will be given on the assumption that the first driving state and the second driving state are present. For example, the state determiner 142 may determine that the host vehicle M will be caused to travel in the first driving state when the host vehicle M is traveling in the host lane L1 in a state in which neighboring vehicles are not present (so-called in the case of single traveling). In this case, the automated driving controller 100 executes driving control such as LKAS (in which the host vehicle M travels while the host lane L1 is maintained (lane keep)) according to the first driving state.

The state determiner 142 determines that the host vehicle M will be caused to travel in the second driving state when the host vehicle M is following behind the preceding vehicle m1 at a speed less than a first predetermined speed Vth (so-called following traveling during congestion). In this case, the automated driving controller 100 executes driving control such as TJP (in which the steering and speed of the host vehicle M are controlled on a congested road) according to the second driving state. The state determiner 142 determines that the host vehicle M will be caused to travel in the second driving state when the host vehicle M is following behind the preceding vehicle m1 at a speed equal to or higher than the first predetermined speed Vth1 and traveling at a speed less than a second predetermined speed Vth2 higher than the first predetermined speed Vth1, and the host vehicle M will be caused to travel in the first driving state when the host vehicle M is traveling at a speed equal to or higher than the second predetermined speed Vth2. In this case, the automated driving controller 100 executes driving control such as ACC (in which the host vehicle is accelerated/decelerated within a speed set in advance such that the host vehicle follows the preceding vehicle while maintaining an appropriate inter-vehicle distance from the preceding vehicle) in the first driving state.

The state determiner 142 determines a driving state during lane change on the basis of details of control performed by the lane change controller 144 and causes driving control such as ALC to be executed on the basis of the determined driving state. For example, the state determiner 142 may execute lane change in a driving state having a highest rate of automation or few tasks requested for an occupant of the host vehicle M from among driving states determined to be controllable by the lane change controller 144. When an operation of setting a driving state by an occupant of the host vehicle M is received, the state determiner 142 executes lane change in a driving state corresponding to the received setting operation.

The lane change controller 144 controls a driving state when lane change from the host lane L1 to the neighboring lane L2 is performed on the basis of environments of the host vehicle M and neighboring vehicles (the other vehicles m1 to m4). In this case, the lane change controller 144 limits an operation environment for executing lane change in the second driving state as compared to an operation environment in which lane change is executed in the first driving state. Hereinafter, lane change control will be described in detail for several control patterns. In addition, in the following description, it is assumed that driving control according to TJP or ACC (speed limited ACC) in which the host vehicle M follows the preceding vehicle m1 in the second driving state in the aforementioned surrounding environment shown in FIG. 3 is being executed.

<First Control Pattern>

In the first control pattern, the lane change controller 144 causes lane change in the second driving state to be executable when other vehicles are present before and after the host vehicle M traveling in the host lane L1 (lane before lane change) and other vehicles are present before and after the target position TA1 of the neighboring lane L2 (target lane that is a lane change destination). "Lane change in the second driving state is executable" may include "lane change according to the first driving state or manual driving is executable" as well as "lane change in the second driving state is executable." The aforementioned condition may be applied to other control patterns which will be described later as a "precondition" for executing lane change in the second driving condition.

In the first control pattern, a driving state during lane change may be controlled on the basis of the first inter-vehicle distance D1 and the second inter-vehicle distance D2 in addition to the aforementioned operation environment. For example, the lane change controller 144 may determine that lane change in the second driving state is executable when the target position TA1 to which lane change will be performed can be set and the second inter-vehicle distance D2 is shorter than the first inter-vehicle distance D1. The lane change controller 144 causes lane change in the first driving state to be executable when the target position TA1 to which lane change will be executed has been set and the second inter-vehicle distance D2 is equal to or longer than the first inter-vehicle distance D1. "Lane change in the first driving state is executable" may include "lane change according to manual driving is executable" as well as "lane change in the first driving state is executable."

That is, in the first control pattern, the second inter-vehicle distance D2 in which the second driving state is executable is limited to being shorter than the second inter-vehicle distance D2 in which the first driving state is executable. According to the above-described first control pattern, it is possible to perform more stable lane change in the second driving state by limiting the target position TA1 in the second driving state.

<Second Control Pattern>

Figure 4:
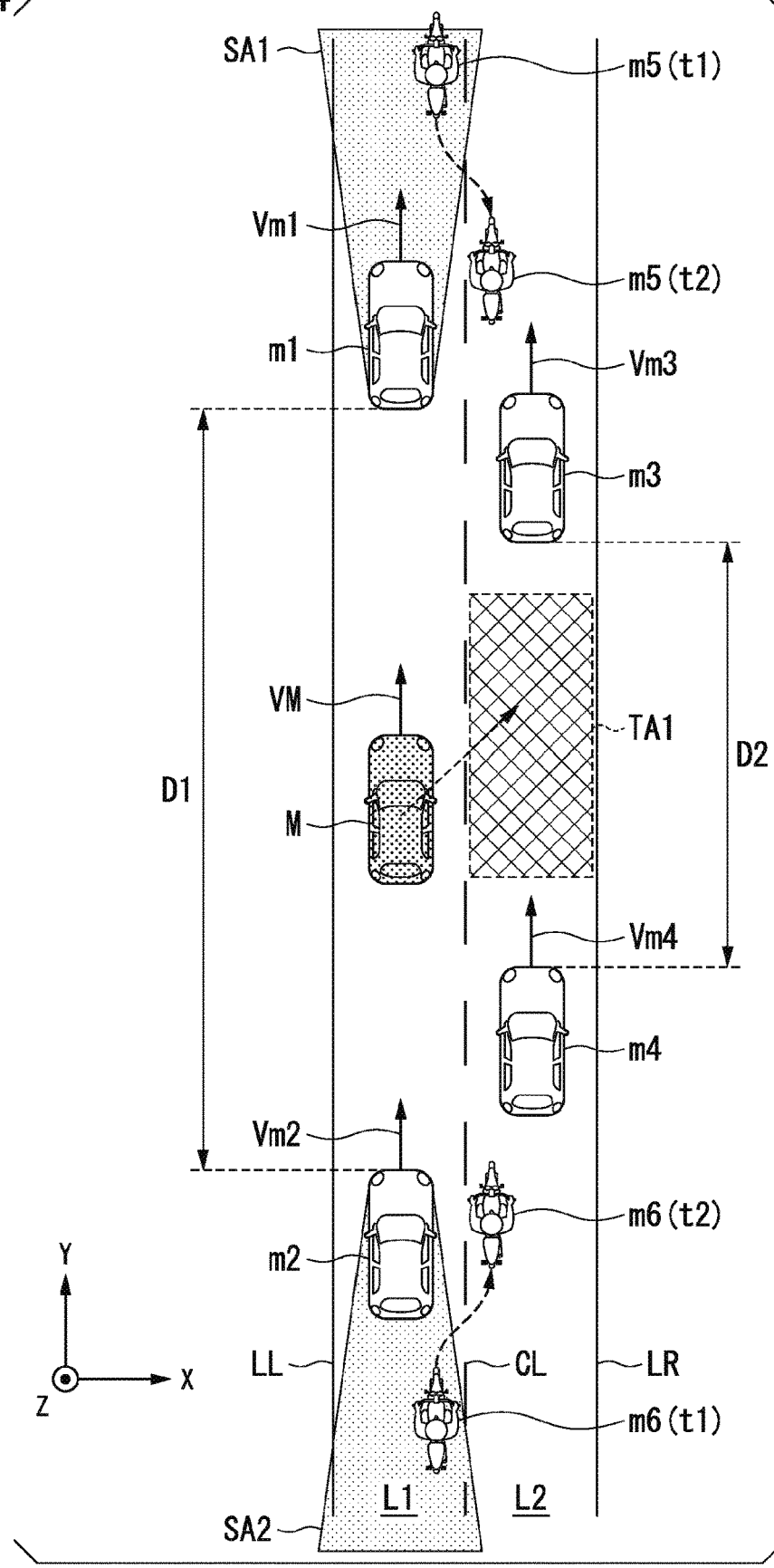
FIG. 4 is a diagram for describing a shielded area.

In a second control pattern, the lane change controller 144 controls the driving state during lane change on the basis of an occlusion area (hereinafter, shielded area) generated by the other vehicles m1 and m2 traveling before and after the host vehicle M in addition to the aforementioned precondition. FIG. 4 is a diagram for describing a shielded area. In the example of FIG. 4, it is assumed that a two-wheeled vehicle m5 traveling in front of the host vehicle M and a two-wheeled vehicle m6 traveling behind the host vehicle M are present in addition to the host vehicle M and the other vehicles m1 to m4. In the example of FIG. 4, t1 and t2 represent time (t1<t2). It is assumed that the two-wheeled vehicle m5 is traveling at a speed Vm5 in the host lane L1 at the time t1 and the two-wheeled vehicle m6 is traveling at a speed Vm6 in the host lane L1 at the time t1.

The shielded area recognizer 136 recognizes a first shielded area SA1 according to the preceding vehicle m1 on the basis of relative positions of the host vehicle M and the preceding vehicle m1, the shape of the preceding vehicle m1, and the like. The shielded area recognizer 136 recognizes a second shielded area SA2 according to the following vehicle on the basis of relative positions of the host vehicle M and the following vehicle m2, the shape of the following vehicle m2, and the like. The shielded area recognizer 136 may predict changes in future behaviors on the basis of past behaviors of the preceding vehicle m1 and the following vehicle m2, a road shape, and the like and recognize the first shielded area SA1 and the second shielded area SA2 on the basis of a prediction result.

The lane change controller 144 determines that lane change in the second driving state is executable when the first shielded area SA1 and the second shielded area SA2 are less than a predetermined area and determines that lane change in the first driving state is executable when one or both of the first shielded area SA1 and the second shielded area SA2 are equal to or greater than the predetermined area. That is, in the second control pattern, a shielded area in which the second driving state is executable is limited to being narrower than a shielded area in which the first driving state is executable.

Figure 5:
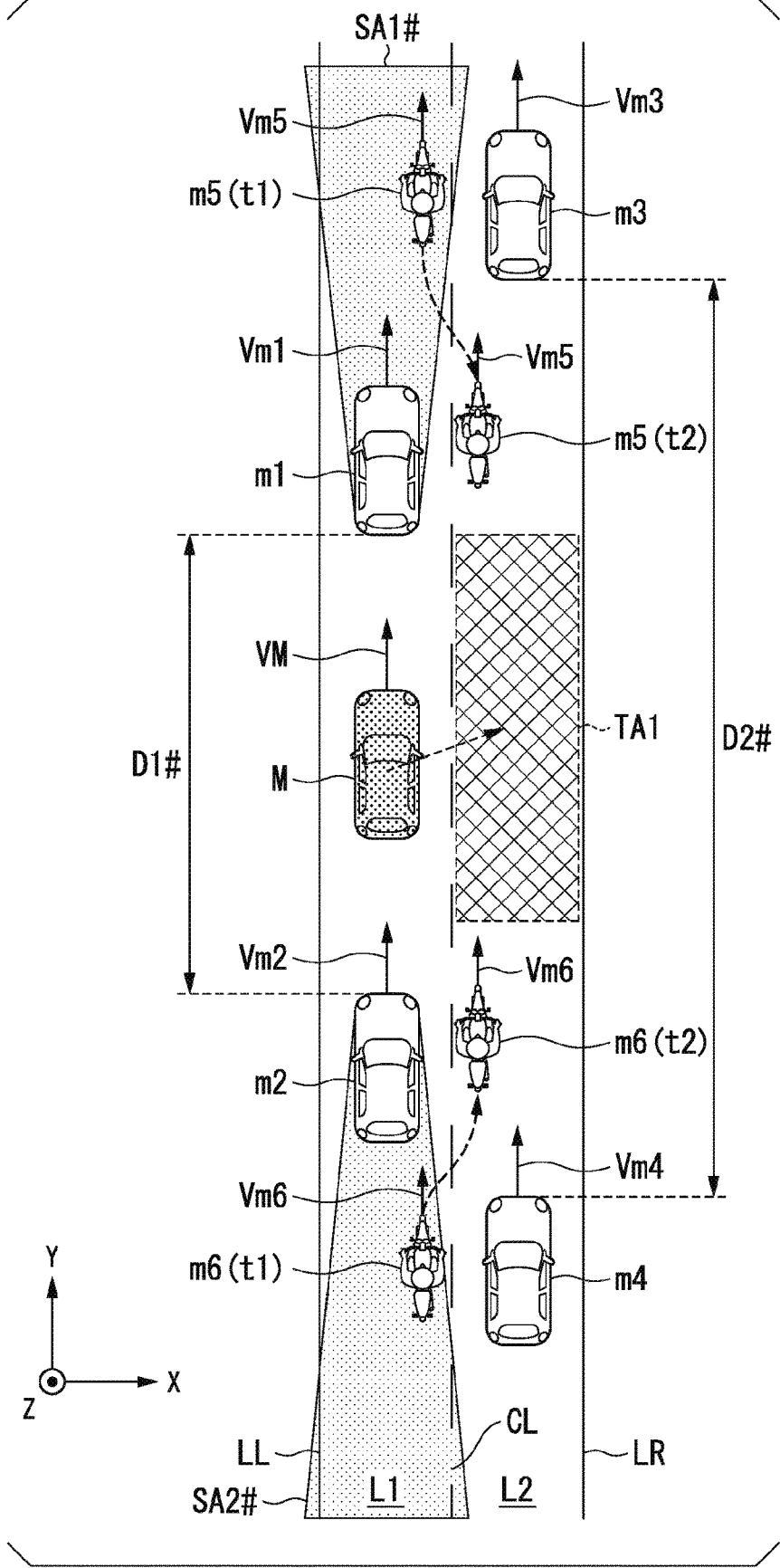
FIG. 5 is a diagram for describing a difference of a shielded area.

FIG. 5 is a diagram for describing difference of shielded areas. In the example of FIG. 5, a shielded area SA1 # of the preceding vehicle m1 traveling in the host lane L1 and a shielded area SA2 # of the following vehicle m2 traveling in the host lane L1 are represented. In the example of FIG. 5, it is assumed that a first inter-vehicle distance D1 # is shorter than the first inter-vehicle distance shown in FIG. 4 and a second inter-vehicle distance D2 # is longer than the second inter-vehicle distance shown in FIG. 4. It is assumed that the shielded area SA1 and the shielded area SA2 are less than a predetermined area and the shielded area SA1 # and the shielded area SA2 # are equal to or greater than the predetermined area.

Here, since a distance between the preceding vehicle m1 shown in FIG. 4 and the host vehicle M is shorter than a distance between the preceding vehicle m1 shown in FIG. 5 and the host vehicle M, the shielded area SA1 included in a predetermined range from the position of the host vehicle M is narrower than the shielded area SA1 #. Accordingly, when the two-wheeled vehicle m5 has changed lanes from the lane L1 to the lane L2 in a period from the time t1 to the time t2, for example, the other vehicle recognizer 132 can recognize the two-wheeled vehicle m5 having time to spare at a position separated from the target position TA1. Since a distance between the following vehicle m2 shown in FIG. 4 and the host vehicle M is longer than a distance between the following vehicle m2 shown in FIG. 5 and the host vehicle M, the shielded area SA2 is narrower than the shielded area SA2 #. Accordingly, when the two-wheeled vehicle m6 has changed lanes from the lane L1 to the lane L2 in the period from the time t1 to the time t2, for example, the other vehicle recognizer 132 can recognize the two-wheeled vehicle m6 having time to spare at a position separated from the target position TA1.

In the example of FIG. 5, the second inter-vehicle distance D2 # is longer than the first inter-vehicle distance D1 #. Accordingly, when the two-wheeled vehicle m5 traveling in front of the preceding vehicle m1 changes lanes to the rear of the front reference vehicle m3, it approaches the target position TA1 and thus there is a case in which the two-wheeled vehicle m5 is not detected or detection thereof is delayed. To the rear of the host vehicle M shown in the example of FIG. 5, when the two-wheeled vehicle m6 traveling behind the following vehicle m2 changes lanes in front of the rear reference vehicle m4 between time t1 to time t2, it approaches the target position TA1 and thus there is a case in which the two-wheeled vehicle m6 is not detected or detection thereof is delayed. Accordingly, in the aforementioned environment, the lane change controller 144 curbs lane change in the second driving state and causes lane change in the first driving state to be executable when a driver desires.

According to the above-described second control pattern, it is possible to reduce the risk due to two-wheeled vehicles not being detected and the like or delay in their detection. Consequently, stabilized driving control can be executed.

<Third Control Pattern>

In a third control pattern, the lane change controller 144 controls a driving state during lane change on the basis of the speeds of the host vehicle M and the other vehicles m1 to m4 in addition to the aforementioned precondition. In this case, first, the lane change controller 144 determines whether the speed Vm3 of the front reference vehicle m3 and the speed Vm4 of the rear reference vehicle m4 recognized by the other vehicle recognizer 132 are lower than a predetermined speed. The predetermined speed may be, for example, a speed determined on the basis of at least one of the speed VM of the host vehicle M, a set speed set for the host vehicle M, and a legal speed limit in the lane L2. The set speed may be, for example, an upper limit speed in speed control executed in the automated driving controller 100 and a speed that can be set by an occupant or the like of the host vehicle M within a certain degree of allowable range.

The lane change controller 144 causes lane change in the second driving state to be executable when the speeds Vm3 and Vm4 are less than the predetermined speed. The lane change controller 144 curbs lane change in the second driving state and causes lane change in the first driving state to be executable when the speeds Vm3 and Vm4 are equal to or greater than the predetermined speed.

That is, in the third control pattern, the speeds of neighboring vehicles at which the second driving state is executable are limited to being lower than the speeds of neighboring vehicles at which the first driving state is executable. According to the aforementioned third control pattern, it is possible to execute stable lane change in the second driving state under appropriate speed conditions.

<Fourth Control Pattern>

In a fourth control pattern, the lane change controller 144 curbs lane change in the second driving state when a preceding vehicle (a vehicle that is a following target) of a lane change destination is changing lanes or is predicted to be likely to change lanes in the near future even when execution conditions for lane change in the second riving state are satisfied according to the first control pattern.

Figure 6:
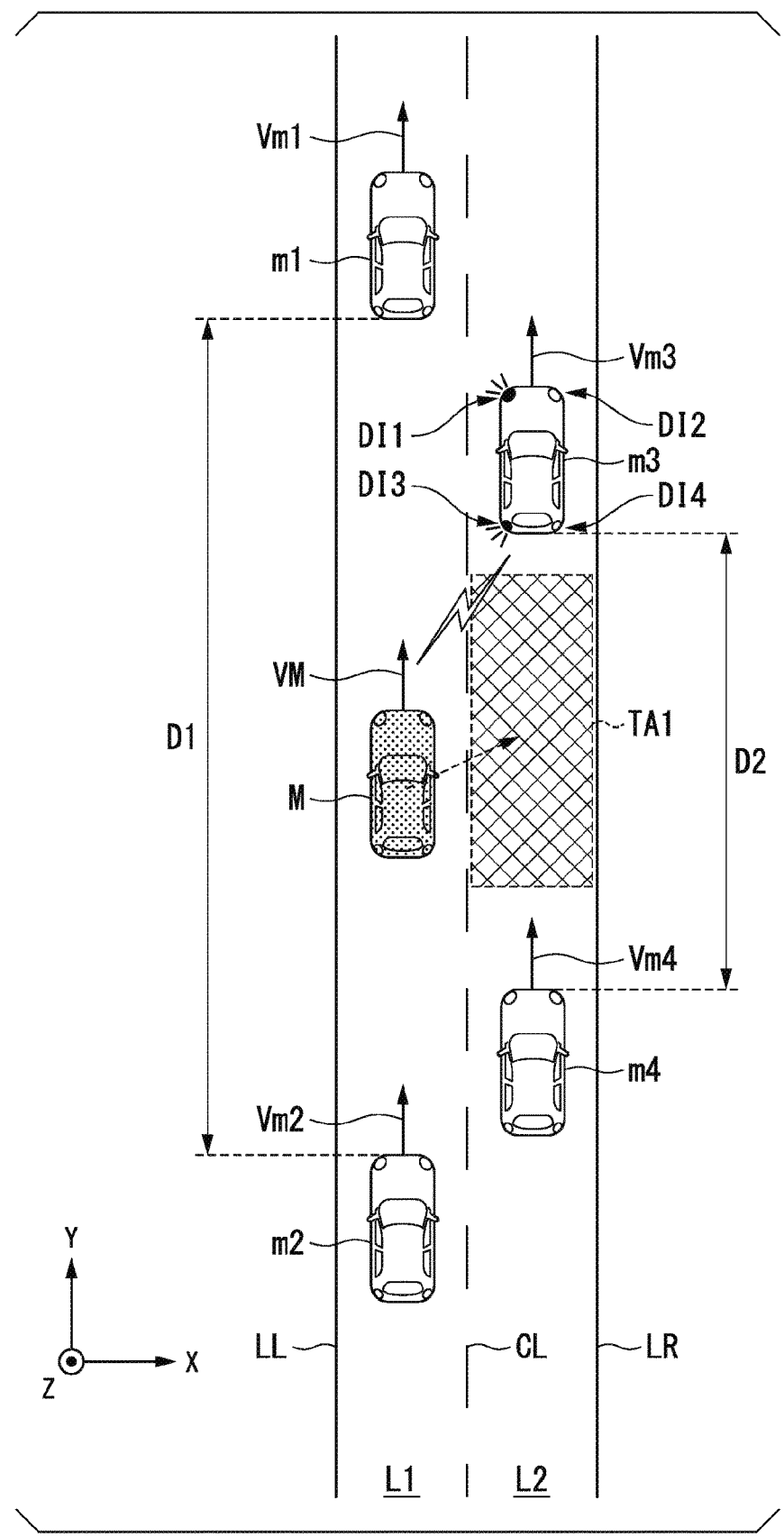
FIG. 6 is a diagram for describing a fourth control pattern.

FIG. 6 is a diagram for describing the fourth control pattern. In the example of FIG. 6, it is assumed that direction indicator lamps DI1 and DI2 are provided at the left and right front ends of the front reference vehicle m3 and direction indicator lamps DI3 and DI4 are provided at the left and right rear ends thereof. The direction indicator lamps DI1 to DI4 are an example of a vehicle exterior indicator. The other vehicle recognizer 132 recognizes a behavior of the front reference vehicle m3 at the target position TA1 and determines whether the front reference vehicle m3 will change lanes on the basis of a recognition result. For example, when the front reference vehicle m3 is traveling while approaching the center line of the lane L1 from the center line of the lane L2, the other vehicle recognizer 132 determines that the front reference vehicle m3 will change lanes from the lane L2 to the lane L1.

The other vehicle recognizer 132 may recognize the presence or absence of blinking of the direction indicator lamps DI1 to DI4 attached to any positions such as the front end or the rear end of the front reference vehicle m3 and predict whether the front reference vehicle m3 will change lanes in the near future on the basis of a recognition result. In the example of FIG. 6, the direction indicator lamps DI1 and DI3 provided at the front end and the rear end on the left side of the front reference vehicle m3 are blinking. Accordingly, the other vehicle recognizer 132 predicts that the front reference vehicle m3 will change lanes from the lane L2 to the lane L1 in the near future.

The other vehicle recognizer 132 may determine whether the front reference vehicle m3 will perform lane change by performing vehicle-to-vehicle communication with the front reference vehicle m3 to inquire of the front reference vehicle m3 whether to perform lane change and acquiring a result of the inquiry.

The lane change controller 144 causes lane change in the second driving state to be executable when the front reference vehicle m3 is not performing lane change and it is predicted that it will not perform lane change in the near future. The lane change controller 144 curbs lane change in the second driving state and causes lane change in the first driving state to be executable when the front reference vehicle m3 performs lane change or is predicted to perform lane change in the near future.

According to the above-described fourth control pattern, when the front reference vehicle m3 is not performing lane change and it is predicted that it will not perform lane change in the near future, it is possible to curb immediate switching to the first driving state after lane change according to lane change of the front reference vehicle m3 by determining that lane change in the second driving state can be executed. Accordingly, it is possible to realize more stable lane change.

Figure 7:
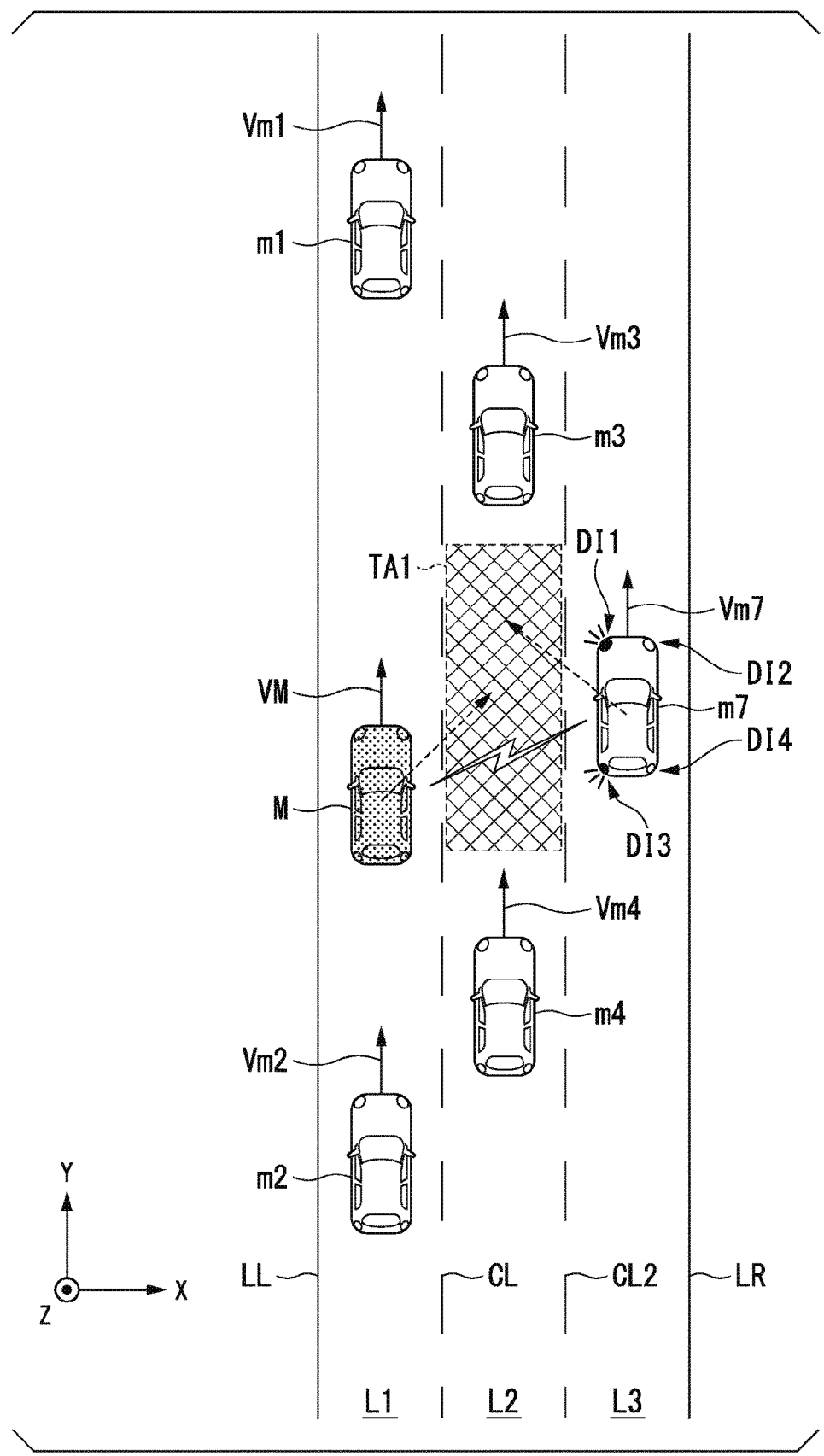
FIG. 7 is a diagram for describing processing of a lane change controller in a three-lane road.

The lane change controller 144 may control a driving state during lane change on the basis of behaviors and the like of other neighboring vehicles (e.g., the rear reference vehicle m4 and the like) as well as the front reference vehicle m3. Further, the lane change controller 144 may determine whether to execute lane change on the basis of results of recognition of neighboring vehicles and the like other than the other vehicles m1 to m4. FIG. 7 is a diagram for describing processing of the lane change controller 144 on a three-lane road. In the example of FIG. 7, it is assumed that a lane L3 in which a vehicle can travel in the same direction (Y direction) as the lanes L1 and L2 is present in a neighboring lane on the right side of the lane L2 in addition to the lanes L1 and L2. It is assumed that another vehicle m7 is traveling at a speed Vm7 in the lane L3. The lane L1 and the lane L2 are defined by markings CL1 and the lane L2 and the lane L3 are defined by markings CL2. The markings CL1 and CL2 represent that lane change between neighboring lanes can be executed.

The other vehicle recognizer 132 recognizes the positions and speeds of the other vehicles m1 to m4 and m7. The other vehicle recognizer 132 determines whether the other vehicle m7 is changing lanes or is predicted to change lanes in the near future according to the behavior of the other vehicle m7, a blinking state of the direction indicator lamps DI1 to DI4 of the other vehicle m7, or vehicle-to-vehicle communication with the other vehicle m7. For example, when the other vehicle m7 is traveling approaching the center line of the lane L2 from the center line of the lane L3, the other vehicle recognizer determines that the other vehicle m7 is changing lanes to the lane L2. The other vehicle recognizer 132 predicts that the other vehicle m7 will change lanes to the lane L2 in the near future when the direction indicator lamps DI1 and DI3 provided on the left side of the other vehicle m7 are blinking or information representing that lane change will be performed in the near future is acquired through vehicle-to-vehicle communication.

Further, when the other vehicle recognizer 132 recognizes or predicts that the other vehicle m7 will change lanes, the other vehicle recognizer 132 determines whether a lane change destination of the other vehicle m7 overlaps a lane change destination of the host vehicle M on the basis of the position, speed, and the like of the other vehicle m7. For example, the other vehicle recognizer 132 may predict a future position on the basis of the position and speed of the other vehicle m7 and determine that the lane change destination of the other vehicle m7 overlaps the lane change destination of the host vehicle M when the predicted position overlaps at least a part of the target position TA1.

The lane change controller 144 curbs lane change in the second driving state when it is determined that the lane change destination of the other vehicle m7 overlaps the lane change destination of the host vehicle M. Accordingly, it is possible to improve stability during traveling.

<Fifth Control Pattern>

In a fifth control pattern, the lane change controller 144 controls a driving state during lane change on the basis of an upper limit number of times of lane change in a predetermined time or a predetermined travel distance of the host vehicle M in addition to the aforementioned precondition. In this case, the lane change controller 144 limits an upper limit number of times of lane change in the second driving state to be less than an upper limit number of times of lane change in the first driving state in a predetermined time or a predetermined travel distance. The predetermined time may be about 10 to 30 [minutes], for example. The predetermined travel distance may be about 1 to 3 [km], for example. The upper limit number of times of lane change in the first driving state may be about 5 to 10 [times], for example. The upper limit number of times of lane change in the second driving state may be about 1 to 3 [times], for example.

Accordingly, the lane change controller 144 curbs lane change in the second driving state and causes lane change in the first driving state to be executable when the number of times of execution of lane change in the second driving state has reached the upper limit number of times in the predetermined time or the predetermined travel distance even when an operation environment of lane change in the second driving state is satisfied according to the above-described control patterns.

According to the aforementioned fifth control pattern, it is possible to curb frequent lane change by limiting the number of times of lane change in the first driving state and the second driving state. It is possible to perform stable traveling in the second driving state and perform lane change based on an intention of a driver in the first driving state by limiting the number of times of lane change in the second driving state to be less than that in the first driving state. Accordingly, more appropriate driving control can be realized in lane change.

<Sixth Control Pattern>

In a sixth control pattern, the lane change controller 144 causes lane change in the second driving state to be executable when a specific area (an example of a predetermined area) is not present within a predetermined distance from the position of the host vehicle M and causes lane change in the first driving state to be executable when the specific area is present within the predetermined distance in addition to the aforementioned precondition. The specific area is an area where lane change of neighboring vehicles is highly likely to be executed and may be, for example, a service area, a parking area, an interchange, a junction, and other areas where branch, merging or the like is present.

Figure 8:
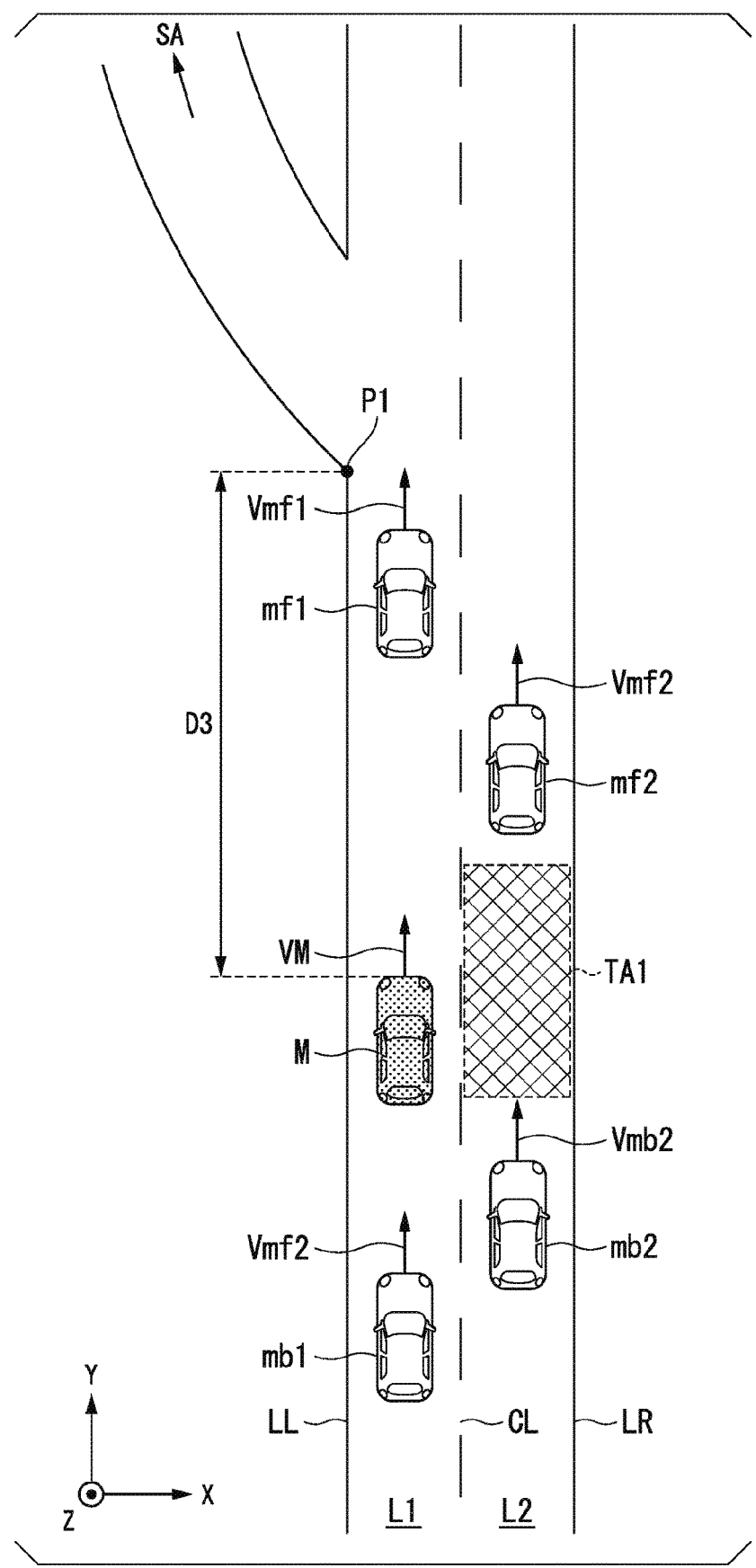
FIG. 8 is a diagram for describing a sixth control pattern.

FIG. 8 is a diagram for describing the sixth control pattern. In the example of FIG. 8, a branch road toward a service area SA is provided in the lane L1. The lane change controller 144 determines whether a distance D3 from a branch point P1 recognized by the recognizer 130 to the host vehicle M is within a predetermined distance, curbs lane change in the second driving state and causes lane change according to the first driving state to be executable when the distance D3 is within the predetermined distance.

According to the above-described sixth control pattern, it is possible to curb lane change in an unstable surrounding environment in which lane change of a neighboring vehicle is predicted. Accordingly, one or both of front and rear vehicles change lanes during ALC, and thus switching from the second driving state to the first driving state can be curbed.

<Seventh Control Pattern>

In a seventh control pattern, the lane change controller 144 compares vehicle information on the preceding vehicle m1 of the host vehicle M and the front reference vehicle m3 with vehicle information on the host vehicle M and controls a driving state during lane change on the basis of a degree of similarity between the vehicle information on the front reference vehicle m3 and the vehicle information on the host vehicle M in addition to the above-described precondition. Vehicle information may include, for example, vehicle type information, shape information, and the like. The vehicle information on the host vehicle M may be stored in the storage 180, for example.

Figure 9:
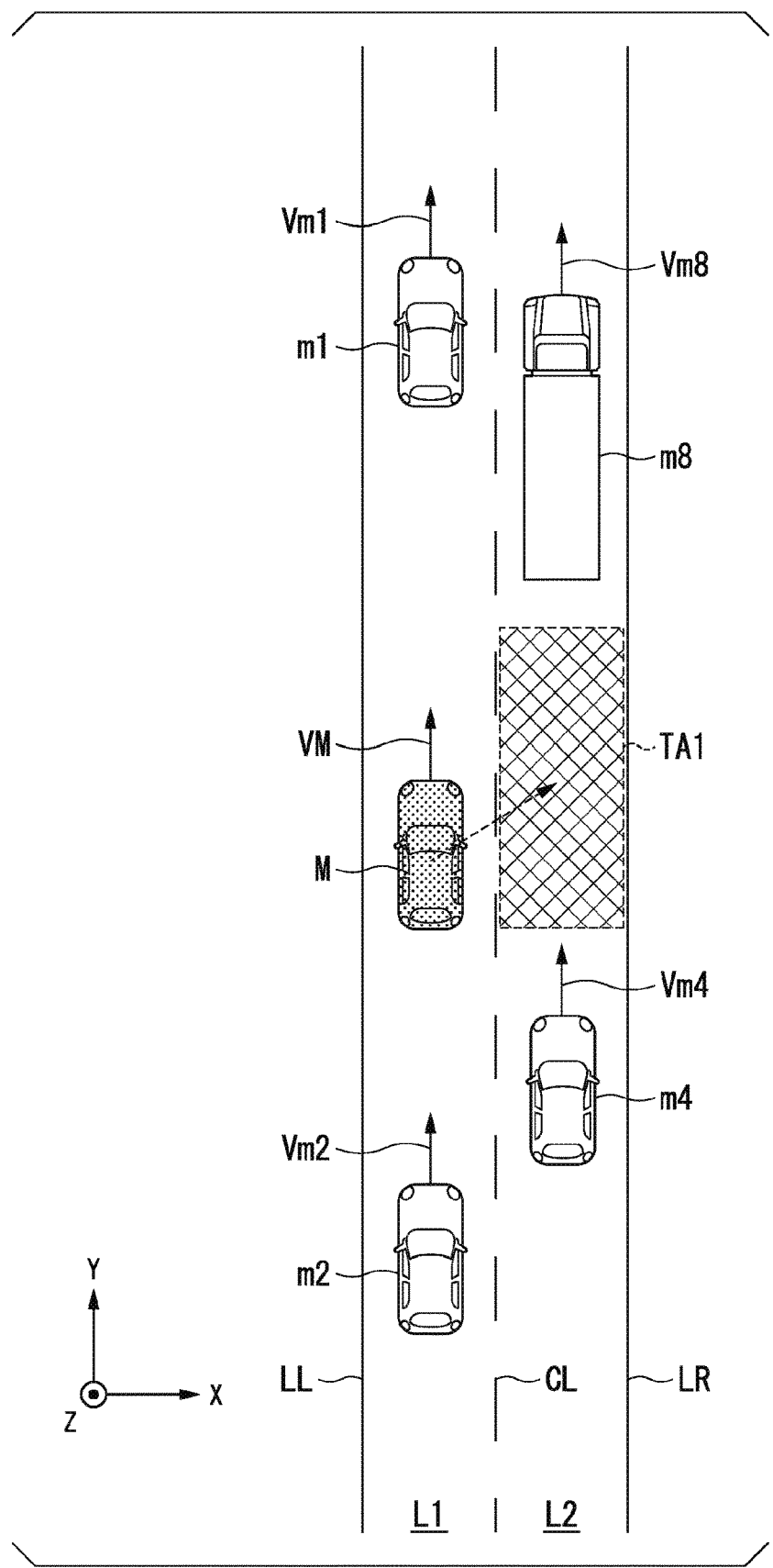
FIG. 9 is a diagram for describing a seventh control pattern.

FIG. 9 is a diagram for describing the seventh control pattern. In the example of FIG. 9, a case in which a preceding vehicle m8 in front of the target position TA1 is a large vehicle such as a truck is represented. In the seventh control pattern, the other vehicle recognizer 132 recognizes vehicle information on other vehicles m1, m2, m4 and m8. For example, the other vehicle recognizer 132 may recognize the shape of an object recognized by the object recognition device 16 or perform vehicle-to-vehicle communication with each of other vehicles to acquire vehicle type information. The other vehicle recognizer 132 may recognize vehicle type information on the basis of the colors of number plates of other vehicles and classification numbers indicated on the number plates.

The lane change controller 144 compares the vehicle information on the host vehicle M with vehicle information on the other vehicles m1 and m8 and performs control such that the host vehicle M follows a vehicle having a higher degree of similarity. In the example of FIG. 9, when the other vehicles m1 and m8 are compared, the other vehicle m1 has a higher degree of similarity with the host vehicle M than the other vehicle m8. Accordingly, the lane change controller 144 maintains the second driving state and executes driving control of following the other vehicle m1 without performing lane change.

When it is determined that the other vehicle m8 has a higher degree of similarity than the other vehicle m1 (for example, when the other vehicle m1 is a large vehicle and the other vehicle m8 is a normal vehicle), the lane change controller 144 causes lane change in the second driving state to be executable and executes driving control of causing the host vehicle M to follow the other vehicle m8 after execution of lane change.

According to the above-described seventh control pattern, it is possible to execute more stable driving control according to a behavior of a preceding vehicle by following a front vehicle having a high degree of similarity of the vehicle information on the host vehicle M. It is possible to curb the host vehicle M following an emergency vehicle such as a fire truck an ambulance of a different type from the host vehicle M.

Each of the above-described first to seventh control patterns may be combined with some or all of other control patterns. In the above-described first to seventh control patterns, the lane change controller 144 may cause transition from the second driving state to the first driving state when a request for lane change is received from an occupant through an operation of a direction indicator or the like in an operation environment in which lane change in the second driving state cannot be executed. When the first driving state is discriminated from manual driving, transition from the second driving state to manual driving may be caused on the basis of an operation of the occupant. Accordingly, it is possible to execute lane change at a timing desired by the occupant.

[Processing Flow]

Figure 10:
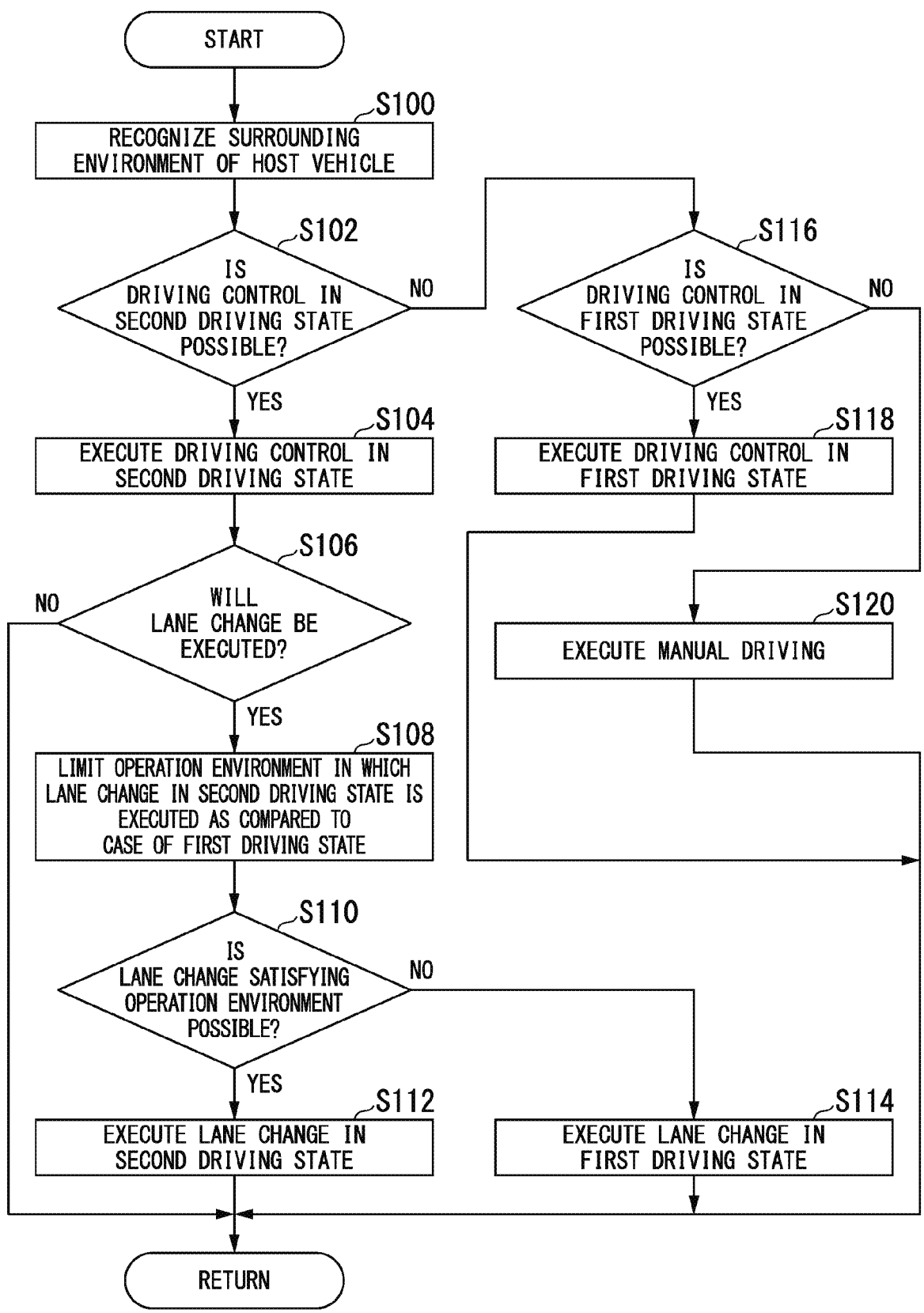
FIG. 10 is a flowchart showing an example of a processing flow executed by an automated driving controller.

FIG. 10 is a flowchart showing an example of a processing flow executed by the automated driving controller 100. Processing of this flowchart may be repeatedly performed at predetermined intervals or timing. In the following example, a description will be given on the assumption that the first driving state and the second driving state are present as automated driving states and the first driving state is discriminated from manual driving.

First, the recognizer 130 recognizes the surrounding environment of the host vehicle M (step S100). Next, the state determiner 142 determines whether driving control in the second driving state is possible on the basis of a recognition result of the recognizer 130, and the like (step S102). When it is determined that driving control in the second driving state is possible, the action plan generator 140 and the second controller 160 executes driving control in the second driving state (step S104). Next, the lane change controller 144 determines whether lane change will be executed on the basis of a recognition result of the recognizer 130, and the like (step S106). When it is determined that lane change will be executed, the lane change controller 144 limits an operation environment in which lane change in the second driving state is executed as compared to a case of the first driving state (step S108). Next, the lane change controller 144 determines whether lane change satisfying the limited operation environment is possible (step S110). When it is determined that the lane change is possible, the action plan generator 140 and the second controller 160 executes lane change in the second driving state (step S112). When it is determined that the lane change is not possible, the action plan generator 140 and the second controller 160 executes lane change in the first driving state (step S114).

When it is determined that driving control in the second driving state is not possible in processing of step S102, the state determiner 142 determines whether driving control in the first driving state is possible (step S116). When it is determined that driving control in the first driving state is possible, the action plan generator 140 and the second controller 160 executes driving control in the first driving state (step S118). When it is determined that driving control in the first driving state is not possible, the automated driving controller 100 executes driving control according to manual driving (step S120). Accordingly, processing of this flowchart ends. When it is determined that lane change will not be executed in processing of S106, processing of this flowchart ends.

According to the above-described embodiment, the automated driving controller 100 can execute more stable automated driving by including the recognizer 130 which recognizes the surrounding environment of the host vehicle M, and a driving controller (the action plan generator 140 and the second controller 160) which performs driving control by controlling one or both of the speed and steering of the host vehicle M on the basis of a recognition result of the recognizer 130, wherein the driving controller performs driving control in at least any of the first driving state and the second driving state having a higher rate of automation or fewer tasks requested for an occupant of the host vehicle than the first driving state, and an operation environment in which lane change of the host vehicle M in the second driving state is executed is limited as compared to the case of the first driving state.

The present embodiment can be implemented in an environment in which following traveling in the second driving state cannot be continued due to lane change, acceleration or the like of a preceding vehicle, for example. According to implementation in the aforementioned environment, it is possible to execute lane change with the second driving state continued and further follow a front reference vehicle of a lane change destination. Accordingly, it is possible to maintain the second driving state and extend a movement range in a limited operation environment according to the embodiment.

According to the embodiment, it is possible to realize more stable driving control by causing lane change to be executable in an operation environment in which a target position of a lane change destination is limited. According to the embodiment, it is possible to curb a delay of detection of a dodging vehicle (e.g., a two-wheeled vehicle) or no detection of the dodging vehicle by causing the second driving state to be continued when shielded areas due to front and rear vehicles in the host lane are less than a predetermined range and causing transition from the second driving state to the first driving state when the shielded areas are equal to or greater than the predetermined range. According to the embodiment, it is possible to perform vehicle control more safely in a state in which a system upper limit speed is not reached by executing lane change in the second driving state when a speed at a lane change destination is equal to or less than a predetermined speed.

According to the embodiment, it is possible to perform more stable lane change by executing lane change on the basis of behavior prediction and the like based on behaviors of neighboring vehicles, external situations, and the like. According to the embodiment, it is possible to perform more stable traveling in the second driving state and allow vehicle control in accordance with an intention of a driver in the first driving state by limiting the number of times of lane change in the second driving state in a predetermined travel distance or a predetermined time to be less than that in the first driving state.

According to the embodiment, it is possible to curb lane change in an unstable situation by limiting lane change in the second driving state in specific areas such as an interchange, a junction, a service area, parking area, and the like.

[Hardware Configuration]

Figure 11:
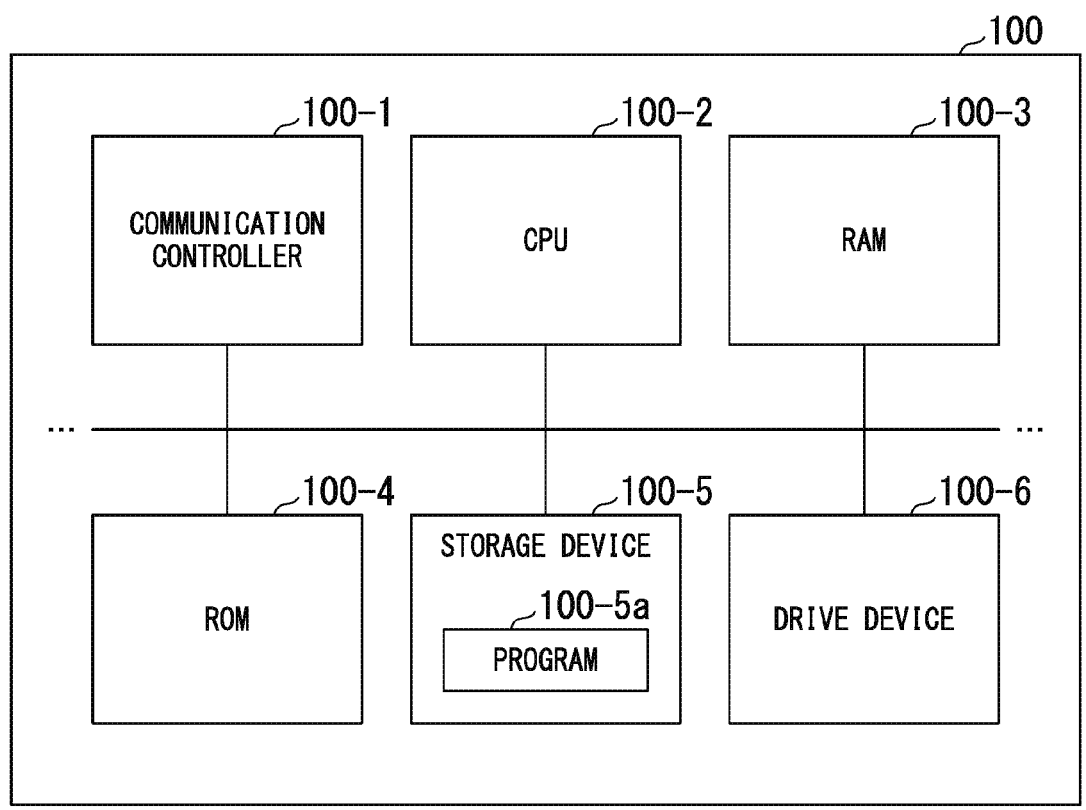
FIG. 11 is a diagram showing an example of a hardware configuration of an automated driving controller of an embodiment.

FIG. 11 is a diagram showing an example of a hardware configuration of the automated driving controller 100 of the embodiment. As illustrated, the automated driving controller 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6, and the like are connected through an internal bus or a dedicated communication line. The communication controller 100-1 performs communication with components other than the automated driving controller 100. A program 100-5a executed by the CPU 100-2 is stored in the storage device 100-5. This program is developed in the RAM 100-3 according to a Direct Memory Access (DMA) controller (not shown) or the like and executed by the CPU 100-2. Accordingly, parts or all of the first controller and the second controller 160 are realized.

The above-described embodiment can be represented as follows.

A vehicle control apparatus including:
a storage device which stores a program; and
a hardware processor,
wherein the hardware processor is configured to, by executing the program stored in the storage device:
recognize a surrounding environment of a host vehicle;
control one or both of a speed and steering of the host vehicle on the basis of a recognition result to perform driving control;
perform the driving control in at least any of a first driving state and a second driving state having a higher rate of automation or fewer tasks requested for an occupant of the host vehicle than the first driving state, an operation environment in which route change of the host vehicle in the second driving state is executed being limited as compared to a case of the first driving state.

While forms for embodying the present invention have been described using embodiments, the present invention is not limited to these embodiments and various modifications and substitutions can be made without departing from the spirit or scope of the present invention.

What is claimed is:

1. A vehicle control apparatus comprising:
a processor that executes instructions to:
recognize a surrounding environment of a host vehicle; and
control one or both of a speed and steering of the host vehicle on the basis of a recognition result to perform driving control,
wherein the processor performs the driving control in at least any of a first driving state and a second driving state,
wherein the second driving state has a higher rate of automation or fewer tasks requested for an occupant of the host vehicle than the first driving state,
wherein an operation environment, in which route change of the host vehicle in the second driving state is executed, is limited as compared to a case of the first driving state, wherein the processor recognizes a first shielded area shielded by a preceding vehicle traveling in front of the host vehicle and a second shielded area shielded by a following vehicle traveling behind the host vehicle in a first lane in which the host vehicle is traveling, and the processor executes the route change in the second driving state when the first shielded area and the second shielded area are less than a predetermined area.

2. The vehicle control apparatus according to claim 1, wherein the processor causes transition of the driving control from the second driving state to the first driving state when a request for the route change is received in an operation environment in which the route change is not executable in the second driving state.

3. The vehicle control apparatus according to claim 1, wherein the processor recognizes a first inter-vehicle distance between a preceding vehicle traveling in front of the host vehicle and a following vehicle traveling behind the host vehicle in a first lane in which the host vehicle is traveling, and the processor causes the first inter-vehicle distance in which the route change is executed in the second driving state to be shorter than an inter-vehicle distance in which the route change is executed in the first driving state.

4. The vehicle control apparatus according to claim 1, wherein the processor recognizes another vehicle at a route change destination of the host vehicle, and the processor performs route change of the host vehicle to a second lane that is the route change destination in the second driving state when a speed of the another vehicle recognized is less than a speed set on the basis of at least one of the speed of the host vehicle, a set speed set for the host vehicle, and a legal speed limit of the second lane.

5. The vehicle control apparatus according to claim 4, wherein the processor performs route change in the second driving state when route change of another vehicle traveling in the second lane is not predicted.

6. The vehicle control apparatus according to claim 1, wherein the processor limits an upper limit number of times of route change in the second driving state in a predetermined time or a predetermined travel distance to being less than an upper limit number of times of route change in the first driving state.

7. The vehicle control apparatus according to claim 1, wherein the processor curbs route change in the second driving state when a position of the host vehicle is within a predetermined distance from a predetermined area.

8. The vehicle control apparatus according to claim 1, wherein the processor recognizes a behavior of another vehicle or predicts a future behavior of the another vehicle, and the processor executes route change in the second driving state on the basis of the behavior of the another vehicle recognized or the future behavior of the another vehicle predicted.

9. The vehicle control apparatus according to claim 8, wherein the processor curbs route change in the second driving state when it is predicted that the another vehicle will perform route change to a target position of the route change destination of the host vehicle on the basis of a recognition result.

10. The vehicle control apparatus according to claim 1, wherein the processor recognizes vehicle information on a first another vehicle traveling in front of the host vehicle in a first lane in which the host vehicle is traveling and a second another vehicle which will be followed by the host vehicle after route change of the host vehicle in a second lane that is the route change destination, and the processor executes driving control of causing the host vehicle to follow another vehicle having a higher degree of similarity with vehicle information of the host vehicle among the first another vehicle and the second another vehicle.

11. A vehicle control method, using an on-board computer, comprising:

recognizing a surrounding environment of a host vehicle;

controlling one or both of a speed and steering of the host vehicle on the basis of a recognition result to perform driving control;

performing the driving control in at least any of a first driving state and a second driving state;

recognizing a first shielded area shielded by a preceding vehicle traveling in front of the host vehicle and a second shielded area shielded by a following vehicle traveling behind the host vehicle in a first lane in which the host vehicle is traveling; and executing the route change in the second driving state when the first shielded area and the second shielded area are less than a predetermined area, wherein the second driving state has a higher rate of automation or fewer tasks requested for an occupant of the host vehicle than the first driving state, wherein an operation environment, in which route change of the host vehicle in the second driving state, is executed is limited as compared to a case of the first driving state.

12. A computer-readable non-transitory storage medium storing a program causing an on-board computer to:

recognize a surrounding environment of a host vehicle;

control one or both of a speed and steering of the host vehicle on the basis of a recognition result to perform driving control;

perform the driving control in at least any of a first driving state and a second driving state;

recognize a first shielded area shielded by a preceding vehicle traveling in front of the host vehicle and a second shielded area shielded by a following vehicle traveling behind the host vehicle in a first lane in which the host vehicle is traveling; and execute the route change in the second driving state when the first shielded area and the second shielded area are less than a predetermined area, wherein the second driving state has a higher rate of automation or fewer tasks requested for an occupant of the host vehicle than the first driving state, wherein an operation environment, in which route change of the host vehicle in the second driving state, is executed is limited as compared to a case of the first driving state.

* * * * *